US007620801B2

(12) United States Patent
Bishop et al.

(10) Patent No.: US 7,620,801 B2
(45) Date of Patent: Nov. 17, 2009

(54) METHODS TO RANDOMLY OR PSEUDO-RANDOMLY, WITHOUT BIAS, SELECT INSTRUCTION FOR PERFORMANCE ANALYSIS IN A MICROPROCESSOR

(75) Inventors: James Wilson Bishop, Leander, TX (US); Michael Stephen Floyd, Austin, TX (US); Alexander Erik Mericas, Austin, TX (US); Robert Dominick Mirabella, Round Rock, TX (US); Dung Quoc Nguyen, Austin, TX (US); Philip Lee Vitale, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 461 days.

(21) Appl. No.: 11/055,848

(22) Filed: Feb. 11, 2005

(65) Prior Publication Data
US 2006/0184776 A1    Aug. 17, 2006

(51) Int. Cl.
*G06F 9/30* (2006.01)
(52) U.S. Cl. .................................................. 712/227
(58) Field of Classification Search .................. 712/227
See application file for complete search history.

(56) References Cited

U.S. PATENT DOCUMENTS

| 4,748,576 | A  | * | 5/1988  | Beker et al. ............... 708/250 |
| 5,694,444 | A  | * | 12/1997 | Bagchi et al. .............. 377/54 |
| 6,195,748 | B1 | * | 2/2001  | Chrysos et al. ............ 712/227 |
| 6,539,502 | B1 | * | 3/2003  | Davidson et al. ........... 714/47 |
| 6,574,727 | B1 | * | 6/2003  | Davidson et al. ........... 712/227 |
| 6,748,522 | B1 | * | 6/2004  | Gregoire et al. ............ 712/227 |
| 2002/0188808 | A1 | * | 12/2002 | Rowlands et al. .......... 711/133 |
| 2004/0205095 | A1 | * | 10/2004 | Gressel et al. ............. 708/253 |
| 2004/0268097 | A1 | * | 12/2004 | Mericas ..................... 712/227 |

* cited by examiner

*Primary Examiner*—Eddie P Chan
*Assistant Examiner*—Keith Vicary
(74) *Attorney, Agent, or Firm*—Yee & Associates, P.C.; Diana R. Gerhardt

(57) ABSTRACT

A method for pseudo-randomly, without bias, selecting instructions for marking in a microprocessor. Responsive to reading an instruction from an instruction cache, an instruction tag associated with the instruction is compared against a pseudo-randomly generated value in a linear feedback shift register (LFSR). If the instruction tag matches the value in the LFSR, a mark bit, indicating the instruction is a marked instruction, is sent with the instruction to an execution unit. Responsive to an indication from the performance monitor, the value in the LFSR is incremented prior to selecting a next instruction to mark. If the value equals a predetermined prime number of increments, the value is reset to all ones to avoid any harmonics with the code stream being executed. Upon receiving the marked instruction, the execution unit combines the marked bit with a selected event and reports the marked event to the performance monitor.

5 Claims, 4 Drawing Sheets

METHODS TO RANDOMLY OR PSEUDO-RANDOMLY, WITHOUT BIAS, SELECT INSTRUCTION FOR PERFORMANCE ANALYSIS IN A MICROPROCESSOR

BACKGROUND OF THE INVENTION

1. Technical Field

The present invention relates to an improved data processing system, and in particular, the present invention is directed to a system and method for randomly or pseudo-randomly, selecting instructions for performance analysis in a microprocessor without systematic bias.

2. Description of Related Art

A typical data processing system utilizes processors to execute a set of instructions in order to perform a certain task, such as reading a specific character from the main memory. However, as the number of tasks required to be executed by the processor increases, the efficiency of the processor's access patterns to memory and the characteristics of such access become important factors for engineers who want to optimize the system. In addition with multiple execution engines and/or multiple threads (e.g. in a superscalar, SMT processor), analysis of the threads' utilization of the processor's resources is also critical. To analyze the performance of a microprocessor, it is useful to know how frequently certain events associated with selected instructions occur.

Currently, the prior art contains mechanisms that can count occurrences of software-selectable events, such as cache misses, instructions executed, I/O data transfer requests, and the time a given process may take to execute within a data processing system. One such mechanism is a performance monitor. Microprocessors may contain performance monitoring logic that counts the frequency of these selectable events. A performance monitor performs monitoring on selected characteristics to assist analysis of a system by determining a machine's state at a particular time. This analysis provides information of how the processor is used when instructions are executed and its interaction with the main memory when data are stored. In addition, the performance monitor may provide the amount of time that has passed between events in a processing system. The performance monitor provides counts of events that may be used by engineers to analyze system performance. This analysis may cause application code changes such as possible relocation of branch instructions and memory accesses to further optimize the performance of a system. Moreover, data may be gathered by the performance monitor on how the processor accesses the data processing system's level 1 and level 2 cache, and main memory in order to identify performance bottlenecks that are specific to a hardware or software environment.

Events within the data processing system are counted by one or more counters within the performance monitor. The operation of such counters is managed by control registers, which are comprised of a plurality of bit fields. In general, both control registers and the counters are readable and writable by software. Thus, by writing values to the control register, a user may select the events within the data processing system to be monitored and specify the conditions under which the counters are enabled.

One method to generate detailed performance monitoring and tracking is through instruction marking. Instruction marking is used to identify the frequency of selectable events as the instructions are being executed. With instruction marking, an instruction is selected for monitoring and any events associated with that instruction are reported as "marked" events. Instruction marking is especially useful in superscalar processors, since multiple instructions may be processed simultaneously as a group and any of the concurrent instructions may cause events which are monitored by the performance monitoring hardware. As a result, it is difficult to identify which instructions caused a particular event.

Existing systems employ a two-stage approach to mark instructions. The first stage of marking instructions is used to select the instructions that are eligible to be matched against operational code (opcode) mask values. In this stage, the instructions are selected to be marked in the instruction fetch unit by the Instruction Match CAM (IMC). The IMC first selects the instructions that are eligible to be matched and then compares the selected instructions to opcode/extended opcode mask values in each of the IMC array rows. If an instruction matches one or more IMC arrays masks, a mark is associated with the instruction and stored with the instruction in the instruction cache. When this instruction is fetched from the instruction cache, the instruction and mark are sent and stored in the instruction buffer.

In the second stage, existing systems use a fixed queue position or pseudo-randomly pick an instruction within a wide dispatch group to mark. If this selected instruction has a mark set in the instruction buffer, a mark is also sent with the instruction when it is dispatched to an execution unit.

A user may select events within the system to be monitored and specify the conditions under which the counters are enabled. Since it is considered unnecessary and highly impractical to monitor every instruction that is executed by a microprocessor due to the extremely large number of instructions that are executed in a short period of time, performance monitoring is typically enabled for only a sample of instructions, or marked instructions. Using instruction sampling, one or more instructions are selected, i.e. sampled, and detailed information about the sampled instruction is collected as the instructions execute.

However, although a pseudo-random sampling for marking instructions may be performed, there is a tendency of introducing a bias towards certain instruction streams. In other words, certain instructions are sampled and marked at a disproportionate amount than what is desired for a random sampling of executed instructions. This bias can occur due to the interdependencies between instructions in the instruction dispatch groups. For example, during group formation instructions are not evenly distributed to all available slots in the dispatch group. There also may be bias introduced by reliance on available but limited execution resource in the processor itself (e.g. not enough Fixed Point Units to service all slots at once). In addition, certain dependencies or "hazards" exist when trying to execute multiple instructions within a code stream simultaneously. For example, as a result of the above biasing, the first slot of the instruction group may be four times more likely than the last slot of the group to be occupied by an instruction at any given time. Also, some instruction slots may be reserved for certain instruction opcodes or types, or that limitation may be dependent on the contents of the other slots in that group or other groups being processed. As a result, some instruction opcodes may be inadequately represented, while other instructions have a much higher likelihood of being marked. Bias can also be introduced by instruction branch loops having the same number (or modulo the number) of instructions as the fixed queue used to mark the instructions. Consequently, biased marking provides an inaccurate view of the performance of a machine.

Therefore, it would be advantageous to have an improved method and system for marking instructions to be able to identify the frequency of certain events associated with selectable instructions without introducing any bias in marking a random distribution of instructions.

SUMMARY OF THE INVENTION

The present invention provides a method, system, and computer program product for randomly or pseudo-randomly selecting instructions for marking in a microprocessor to avoid bias.

Two basic things are required to remove bias. The first is a source of instructions against which to sample that has no inherent dependencies to the code stream. The second is a way to sample out of that unbiased source such that biases due to harmonics are avoided. Using the instruction buffer (IBUF) to select instructions is one method, since it has no inherent biasing, being a circular queue independent of the instruction stream (group formation), not affected by dependencies between instructions, and not altered based on available resources (such as execution engines) in the processor. Prior art used superscalar dispatch slots sampling against which to perform the selection, which is biased by all three above dependencies. To sample "randomly" one also needs to either use a PRPG (pseudo-random pattern generator, in this case a linear feedback shift register (LFSR)) and/or an external asynchronous time reference.

Ideally, with the mechanism of the present invention, a time reference or clock source, which is asynchronous to the processor clock used to execute instructions, may be used to mark instructions randomly. In conjunction with an unbiased source of instructions against which to mark, such as the instruction buffer, true "random" and unbiased sampling may be achieved.

However, an asynchronous clock source is not always readily available to the processor. Therefore, with the mechanism of the present invention, selectable instructions may be pseudo-randomly marked without introducing bias in a random distribution of instructions. Responsive to reading an instruction from an instruction cache, an instruction tag associated with the instruction is compared against a pseudo-randomly generated value in a linear feedback shift register. If the instruction tag matches the pseudo-randomly generated value in the linear feedback register, a mark bit is sent with the instruction to an execution unit for execution, wherein the mark bit indicates that the instruction is a marked instruction. The instruction is also reported to the performance monitor as a marked instruction.

In addition, responsive to an indication from the performance monitor, the pseudo-randomly generated value in the linear feedback shift register is incremented prior to selecting a next instruction to mark. A determination is made as to whether the incremented value in the linear feedback shift register has been shifted a predetermined prime number of times, and if so, the value is reset to all ones. Alternately, an asynchronous clock source, if available, may be used to periodically reset the LFSR to inject further "true" randomness.

Upon receiving the marked instruction, the execution unit combines the marked bit in the marked instruction with a selected event and reports the marked event to the performance monitoring unit.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
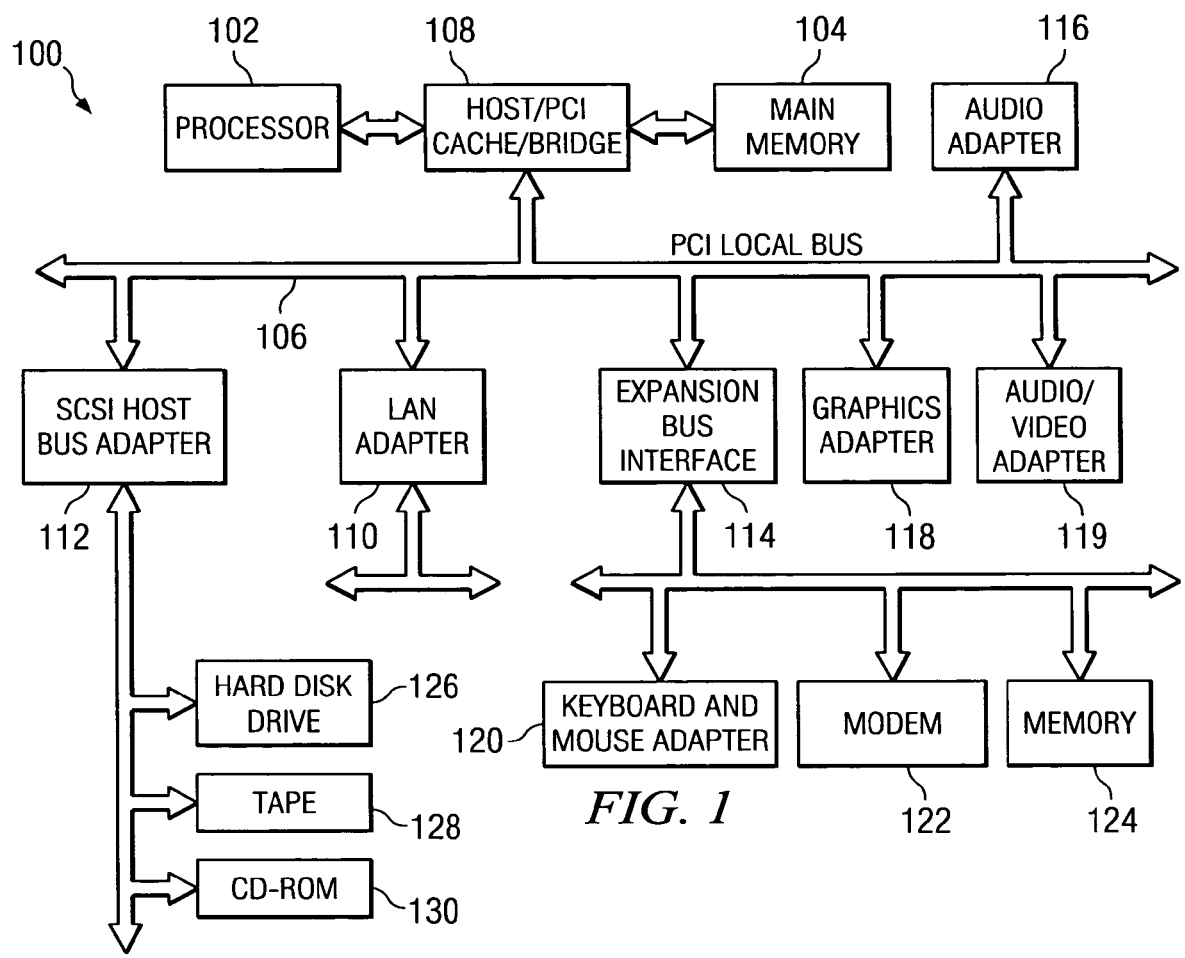
FIG. 1 is a pictorial representation of a data processing system in which the present invention may be implemented.

With reference now to FIG. 1, an exemplary block diagram of a data processing system is shown in which the present invention may be implemented. Data processing system 100 is an example of a computer, in which code or instructions implementing the processes of the present invention may be located. Data processing system 100 employs a peripheral component interconnect (PCI) local bus architecture. Although the depicted example employs a PCI bus, other bus architectures such as Accelerated Graphics Port (AGP) and Industry Standard Architecture (ISA) may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, small computer system interface SCSI host bus adapter 112, and expansion bus interface 114 are connected to PCI local bus 106 by direct component connection. In contrast, audio adapter 116, graphics adapter 118, and audio/video adapter 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM drive 130. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system such as Windows XP, which is available from Microsoft Corporation. An object oriented programming system such as Java may run in conjunction with the operating system and provides calls to the operating system from Java programs or applications executing on client 100. "Java" is a trademark of Sun Microsystems, Inc. Instructions for the operating system, the object-oriented programming system, and applications or programs are located on storage devices, such as hard disk drive 126, and may be loaded into main memory 104 for execution by processor 102.

Those of ordinary skill in the art will appreciate that the hardware in FIG. 1 may vary depending on the implementation. Other internal hardware or peripheral devices, such as flash read-only memory (ROM), equivalent nonvolatile memory, or optical disk drives and the like, may be used in addition to or in place of the hardware depicted in FIG. 1. Also, the processes of the present invention may be applied to a multiprocessor data processing system.

For example, data processing system 100, if optionally configured as a network computer, may not include SCSI host bus adapter 112, hard disk drive 126, tape drive 128, and CD-ROM 130. In that case, the computer, to be properly called a client computer, includes some type of network communication interface, such as LAN adapter 110, modem 122, or the like. As another example, data processing system 100 may be a stand-alone system configured to be bootable without relying on some type of network communication interface, whether or not data processing system 100 comprises some type of network communication interface. As a further example, data processing system 100 may be a personal digital assistant (PDA), which is configured with ROM and/or flash ROM to provide non-volatile memory for storing operating system files and/or user-generated data. The depicted example in FIG. 1 and above-described examples are not meant to imply architectural limitations.

The processes of the present invention are performed by processor 102 using computer implemented instructions, which may be located in a memory such as, for example, main memory 104, memory 124, or in one or more peripheral devices 126-130.

Figure 2:
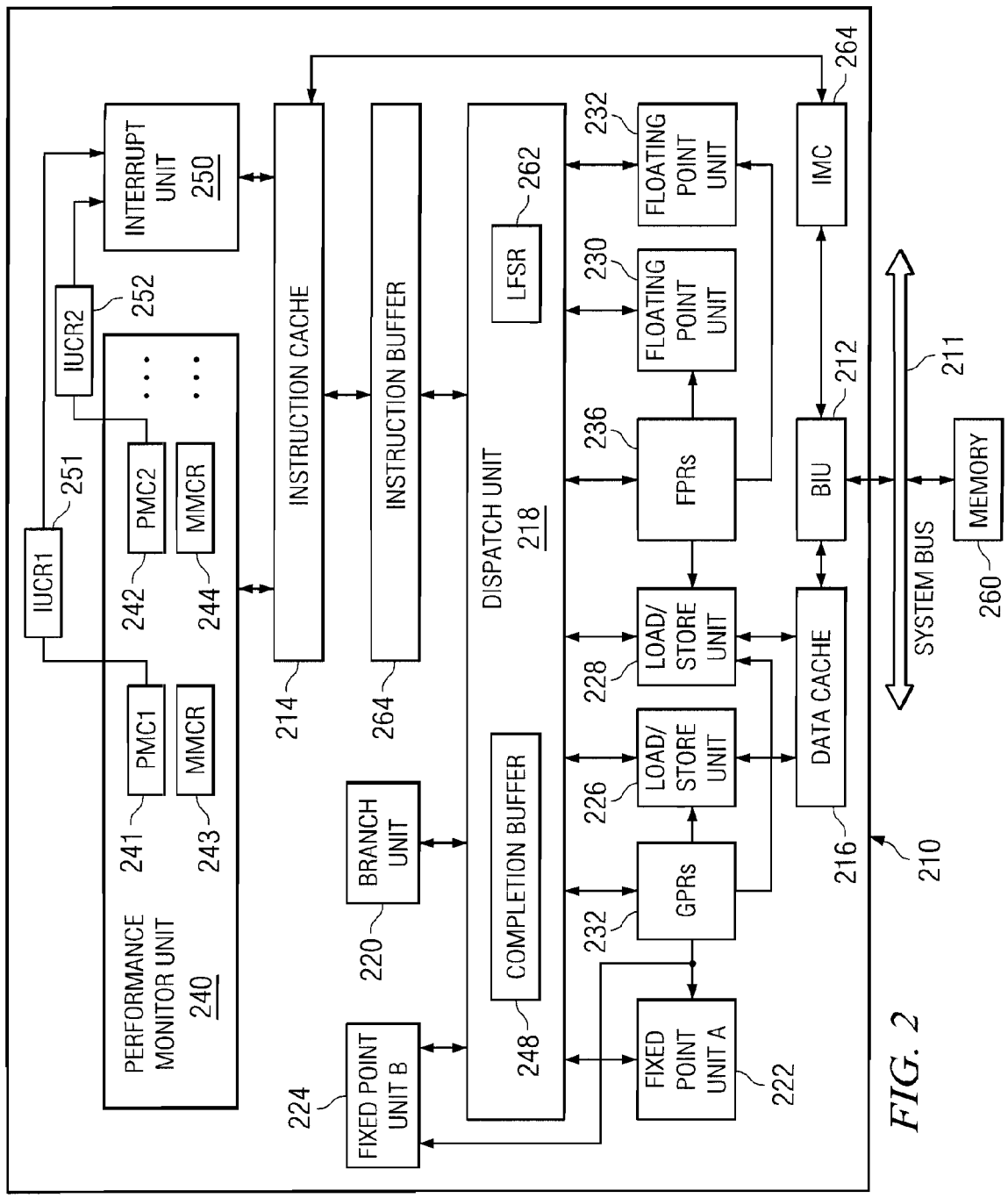
FIG. 2 is an exemplary block diagram of a processor system for processing information in accordance with a preferred embodiment of the present invention.

Turning next to FIG. 2, an exemplary block diagram of a processor system for processing information is depicted in accordance with a preferred embodiment of the present invention. Processor 210 may be implemented as processor 102 in FIG. 1.

In a preferred embodiment, processor 210 is a single integrated circuit superscalar microprocessor. Accordingly, as discussed further herein below, processor 210 includes various units, registers, buffers, memories, and other sections, all of which are formed by integrated circuitry. Also, in the preferred embodiment, processor 210 operates according to reduced instruction set computer (RISC) techniques. As shown in FIG. 2, system bus 211 is connected to a bus interface unit (BIU) 212 of processor 210. BIU 212 controls the transfer of information between processor 210 and system bus 211.

BIU 212 is connected to an instruction cache 214 via instruction match CAM (IMC) 264 and to data cache 216 of processor 210. Instruction match CAM 264 selects instructions eligible to be marked and compares the selected instructions to opcode/extended opcode mask values in each of the IMC array rows. If an instruction matches one or more IMC arrays masks, a mark is associated with the instruction and stored with the instruction in the instruction cache. When this instruction is fetched from instruction cache 214, the instruction and mark are sent and stored in instruction buffer 264. Each instruction in instruction buffer 264 is assigned an instruction tag (ITAG). An ITAG is the address of the instruction in instruction buffer 264.

Instruction cache 214 outputs instructions to dispatch unit 218 via instruction buffer 264. In response to such instructions from instruction buffer 264, dispatch unit 218 selectively outputs instructions to other execution circuitry of processor 210.

In addition to dispatch unit 218, in the preferred embodiment, the execution circuitry of processor 210 includes multiple execution units, namely a branch unit 220, a fixed-point unit A (FXUA) 222, a fixed-point unit B (FXUB) 224, load/store units (LSU) 226 and 228, and floating-point units (FPU) 230 and 232. FXUA 222, FXUB 224, and LSU 226 and 228 input their source operand information from general-purpose architectural registers (GPRs) 232. FPU 230 and 232 input source operand information from floating-point architectural registers (FPRs) 236.

In response to a Load instruction, LSU 226 and 228 input information from data cache 216. If such information is not stored in data cache 216, then data cache 216 inputs (through BIU 212 and system bus 211) such information from a system memory 260 connected to system bus 211. Moreover, data cache 216 is able to output (through BIU 212 and system bus 211) information from data cache 216 to system memory 260 connected to system bus 211. In response to a Store instruction, LSU 228 inputs information from a selected one of GPRs 232 and FPRs 236 and copies such information to data cache 216.

From dispatch unit 218, branch unit 220 inputs instructions and signals indicating a present state of processor 210. In response to such instructions and signals, branch unit 220 outputs (to dispatch unit 218) signals indicating suitable memory addresses storing a sequence of instructions for execution by processor 210. In response to such signals from branch unit 220, dispatch unit 218 inputs the indicated sequence of instructions from instruction cache 214. If one or more of the sequence of instructions is not stored in instruction cache 214, then instruction cache 214 inputs (through BIU 212 and system bus 211) such instructions from system memory 260 connected to system bus 211.

In response to the instructions input from instruction cache 214, dispatch unit 218 selectively dispatches the instructions to selected ones of execution units 220, 222, 224, 226, 228, 230 and 232. Prior to sending an instruction to the execution units, a comparison may be performed between the ITAG of the instruction in instruction buffer 264 and linear feedback shift register (LFSR) 262. LFSR 262 is used to pseudo-randomly select instructions for marking by generating pseudo-random patterns of particular values. Upon performing the compare, dispatch unit 218 sends a mark bit with an instruction to the execution unit if the ITAG of the instruction matches the high order bits of LFSR 262.

Each execution unit executes one or more instructions of a particular class of instructions. For example, FXUA 222 and FXUB 224 execute a first class of fixed-point mathematical operations on source operands, such as addition, subtraction, ANDing, ORing and XORing. FPU 230 executes floating-point operations on source operands, such as floating-point multiplication and division.

Processor 210 achieves high performance by processing multiple instructions simultaneously at various ones of execution units 220, 222, 224, 226, 228, 230, and 232. Accordingly, each instruction is processed as a sequence of stages, each being executable in parallel with stages of other instructions. Such a technique is called "pipelining." In a significant aspect of the illustrative embodiment, an instruction is normally processed as five stages, namely fetch, decode, dispatch, execute, and completion.

In the fetch stage, dispatch unit 218 selectively inputs (from instruction cache 214 through instruction buffer 264) one or more instructions from one or more memory addresses storing the sequence of instructions discussed further hereinabove in connection with branch unit 220, and dispatch unit 218.

In the decode stage, dispatch unit 218 decodes up to five fetched instructions.

In the dispatch stage, dispatch unit 218 selectively dispatches up to five decoded instructions to selected (in response to the decoding in the decode stage) ones of execution units 220, 222, 224, 226, 228, 230, and 232 after reserving rename buffer entries for the dispatched instructions' results (destination operand information). In the dispatch stage, operand information is supplied to the selected execution units for dispatched instructions. Processor 210 dispatches instructions in order of their programmed sequence.

In the execute stage, execution units execute their dispatched instructions and output results (destination operand information) of their operations. In this manner, processor 210 is able to execute instructions out-of-order relative to their programmed sequence.

In the completion stage, dispatch unit 218 indicates an instruction is "complete." Processor 210 "completes" instructions in order of their programmed sequence.

Completion buffer 248 is provided within dispatch 218 to track the completion of the multiple instructions that are being executed within the execution units. Upon an indication that an instruction or a group of instructions have been completed successfully, in an application specified sequential order, completion buffer 248 may be utilized to initiate the transfer of the results of those completed instructions to the associated general-purpose registers.

In addition, processor 210 also includes performance monitor unit 240, which is connected to instruction cache 214 as well as other units in processor 210. Operation of processor 210 can be monitored utilizing performance monitor unit 240, which in this illustrative embodiment is a software-accessible mechanism capable of providing detailed information descriptive of the utilization of instruction execution resources and storage control. Although not illustrated in FIG. 2, performance monitor unit 240 is coupled to each functional unit of processor 210 to permit the monitoring of all aspects of the operation of processor 210, including, for example, reconstructing the relationship between events, identifying false triggering, identifying performance bottlenecks, monitoring pipeline stalls, monitoring idle processor cycles, determining dispatch efficiency, determining branch efficiency, determining the performance penalty of misaligned data accesses, identifying the frequency of execution of serialization instructions, identifying inhibited interrupts, and determining performance efficiency. The events of interest also may include, for example, time for instruction decode, execution of instructions, branch events, cache misses, and cache hits.

Performance monitor unit 240 includes an implementation-dependent number (e.g., 2-8) of counters 241-242, labeled PMC1 and PMC2, which are utilized to count occurrences of selected events. Performance monitor unit 240 further includes at least one monitor mode control register (MMCR). In this example, two control registers, MMCRs 243 and 244 are present that specify the function of counters 241-242. Counters 241-242 and MMCRs 243-244 may be implemented simply as addresses in I/O space. In another alternative embodiment, the control registers and counters may be accessed indirectly via an index register. This embodiment is implemented in the IA-64 architecture in processors from Intel Corporation.

Additionally, processor 210 also includes interrupt unit 250, which is connected to instruction cache 214. Additionally, although not shown in FIG. 2, interrupt unit 250 is connected to other functional units within processor 210. Interrupt unit 250 may receive signals from other functional units and initiate an action, such as starting an error handling or trap process. In these examples, interrupt unit 250 is employed to generate interrupts and exceptions that may occur during execution of a program. In addition, for each performance monitoring counter such as PMC1 241, there is a corresponding interrupt unit control register (IUCR), such as IUCR2 252 that is accessible by the interrupt unit 250. In this example, IUCR1 251 corresponds to PMC1 241. IUCR2 252 corresponds to PMC2 242. IUCR1 251 and IUCR2 252 identify which interrupt generates a signal, so that PMC1 241 and PMC2 242 may count events associated with that interrupt.

The present invention provides a method, apparatus, and computer instructions for monitoring performance of a data processing system by randomly selecting instructions for marking in a microprocessor. The mechanism of the present invention inserts randomness into the instruction marking to avoid biasing. In a preferred embodiment of the present invention, a linear feedback shift register (LFSR) is used to pseudo-randomly select instructions for marking. An LFSR is a hardware circuit that is used to generate pseudo-random patterns of particular values.

An instruction match CAM (IMC) is used to select instructions in the instruction fetch unit that are candidates to be marked. An instruction is eligible to be marked if the instruction matches an opcode/extended mask value in the IMC array. In existing systems, if an instruction matches an opcode mask value in the IMC array, a mark set by the IMC is associated with the instruction and stored with the instruction in the instruction cache.

The present invention improves upon the prior art method by inserting randomness into instruction selection for marking by using tags associated with each instruction to identify matches, selected either randomly or pseudo-randomly. For instance, an instruction in the instruction cache may be read by the instruction buffer, or IBUF. In a preferred embodiment, the IBUF is used to hold 64 instructions. Each instruction in the instruction buffer is assigned an instruction tag (ITAG). An ITAG is the address of the instruction in the instruction buffer. The instruction buffer is a circular queue, and so the ITAGs have no biasing in relation to the code stream since the address in that buffer is arbitrary and completely unrelated to the code stream running on the processor. When a dispatch unit sends an instruction to the execution units (e.g., load/store unit), the ITAG is sent with the instruction. In each cycle, the dispatch unit may read up to five instructions out of the instruction buffer and dispatch these instructions to multiple execution units.

In one embodiment, an asynchronous clock source or time reference is used to choose when to select an ITAG to mark. This asynchronous reference may be an external oscillator already in existence for the purpose of maintaining a real-time clock or TOD (Time of Day) function. For example, every time the asynchronous reference changes or a programmed number of changes occur in the asynchronous source, the next ITAG coming out of the IBUF as selected by the RPTR is selected to be marked. In an alternate embodiment, the external time reference causes a mark only if the current instruction ITAG was also previously selected by the IMC using an existing method.

In the preferred embodiment, prior to sending the instruction and ITAG to the execution units, a comparison is performed between the ITAG of the instruction and the LFSR to randomly select instructions to be marked. Upon performing the compare, a mark is sent to the execution unit if the ITAG of the instruction matches the high order bits if the LFSR. For example, a compare of the ITAG may be performed against the high order 6 bits of a 16-bit LFSR. Instructions with ITAGs matching the value in the LFSR may then be reported to the performance monitor hardware as marked instructions.

Before using the LFSR, values in the LFSR must first be initialized to 0xFFFF (a value of zero). One method of performing this step is by scan initialization during system boot. To avoid confusion, only a single instruction mark is allowed to be active in the processor at a given time. Once the marked instruction is reported to the performance monitoring unit, the value in the LFSR is incremented (shifted by one position) before selecting the next instruction to mark. When the value in the LFSR reaches 0x800B, the equivalent of 65521 increments (a prime number close to the maximum value of the LFSR, 65534), the value in the LFSR is reset to 0xFFFF.

Thus, the mechanism of the present invention provides multiple means of selecting the instruction to insert randomness and avoid bias. For instance, one such means for avoiding bias with the present invention is the assignment of ITAGs to instructions in the instruction buffer. The assignment of instructions to ITAGs is only biased when the code repeats or loops at the same harmonic as the number of entries in the instruction buffer. Another means for avoiding bias with the present invention is through the comparison of the ITAG against certain bits in the LFSR to insert further pseudo-randomness. A third means for avoiding bias is the resetting of the LFSR when the value in the LFSR reaches a prime number, which again allows for avoiding harmonic situations. A fourth means for avoiding bias is to pseudo-randomly select which of the 6 bits of the 16-bit LFSR to use in matching against the ITAG through the use of a secondary LFSR. Yet another method to further randomize the pseudo-random LFSR output would be to implement a so-called "spreading network" or further Boolean logic applied to the LFSR output, a technique traditionally used by hardware test engineers to remove adjacent bit dependencies caused by the shift operation of the LFSR. An alternate method to further randomize the pseudo-random LFSR output would be to instead increment or reset the LFSR when an asynchronous time reference clock occurs, if one is available to the processor. This method is truly "random" to the code stream executing since the reference clock is completely asynchronous to the instructions being executed.

In an alternative embodiment, the mechanism of the present invention may also be combined with existing methods for selecting instructions for marking. For example, the present invention may be utilized to send a mark to an instruction unit if an instruction selected by the IMC using an existing method is also selected by comparing the value in the LFSR against tags associated with each instruction to identify matches as in the mechanism of the present invention.

Figure 3:
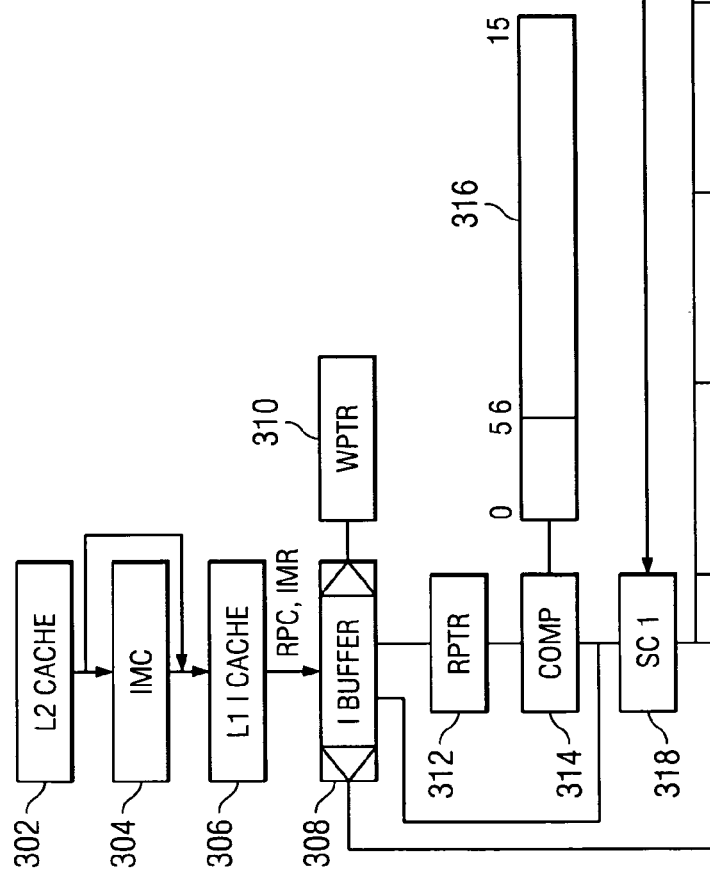
FIG. 3 is exemplary block diagram showing greater detail within FIG. 2 of the components used for random instruction marking in accordance with a preferred embodiment of the present invention.
Figure 3:
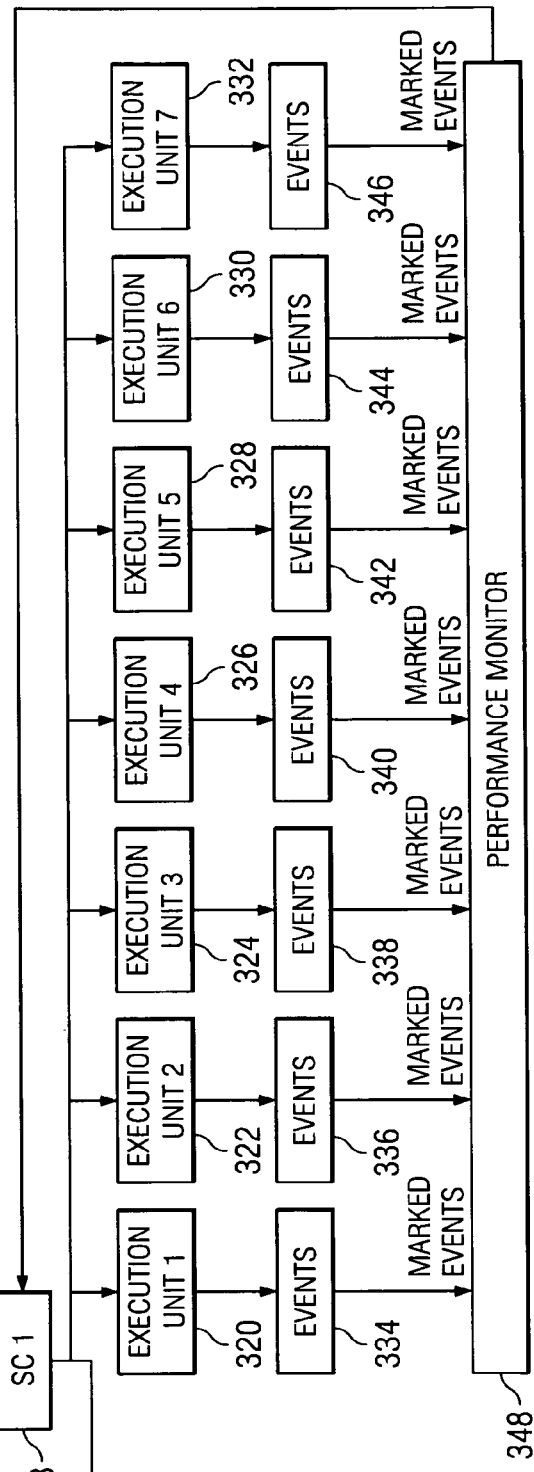

Turning next to FIG. 3, an exemplary block diagram showing greater detail within FIG. 2 of the components used for random instruction marking in accordance with a preferred embodiment of the present invention is provided. These random marking instruction components may be implemented in a processor system, such as processor system 210 in FIG. 2.

In this illustrative example, 32-bit PowerPC instructions are fetched data from L2 cache 302. These 32-bit instructions are sent to L1 instruction cache 306, which contains stored instructions. Upon sending the instructions to L1 instruction cache 306, instruction match cam (IMC) 304 determines if the sent instructions are eligible to be marked. IMC 304 comprises an array of opcode/extended opcode mask values. IMC 304 identifies eligible instructions by comparing the instructions to opcode mask values in each of the IMC array rows. The IMC contains several (e.g., eight different) programmable opcode values used to match against the instruction stream. If the instruction opcode matches one of the several entries in the IMC, the instruction is marked.

When IMC 304 identifies a match, IMC 304 sets the mark bit associated with the instruction. The mark bit and the PowerPC instruction are written to L1 instruction cache 306, and from this cache, the mark bit and the PowerPC instruction may be written to instruction buffer 308. For example, the mark bit and instruction may be written to an appropriate entry in a 64 entry buffer using write pointer (WPTR) logic 310. Similarly, the PowerPC instruction and the mark bit may be read out of instruction buffer 308 using read pointer (RPTR) logic 312.

RPTR logic 312 generates an address for an instruction in IBUF 308 sequentially as the instruction stream executes. Comparison 314 is performed between this address and LFSR 316. For example, in 16-bit LFSR 316, the high order six bits of the LFSR are compared against all six bits of the read pointer address. In alternate embodiments, different combinations of 6 bits from the 16 possible bits in LFSR 316 may be used. After comparison 314 is performed, the LFSR 316 is incremented (by shifting one bit) in response to a signal from a performance monitoring unit, such as performance monitor 348. At this point, if the value in LFSR 316 equals 0x800B, a preselected prime number of shift increments, such as 65521, LFSR 316 is reset to 0xFFFF, a value of zero.

Performance monitoring unit 348 is also used to determine how the mark bit is set when the corresponding instruction is dispatched to a particular execution unit (e.g., execution units 1 320 through 7 332.). This determination is made based on 2-bit select 318 from performance monitor unit 348. For example, a mark may be sent if the RPTR matches the 6 bits of the LFSR or the mark bit in the instruction buffer is set and/or a combination of both.

Upon receiving the mark bit and instruction, the execution unit logically AND's the mark bit with a selected event, such as events 334-346 to form a marked event. For instance, execution unit 320 combines the mark bit with event 334. The event, now marked, is then reported to performance monitoring unit 348, wherein the event may then be counted for performance analysis purposes. An example of a marked event is an instruction that is dispatched to the load/store unit and the data is not found in the L1 data cache—this marked event would be a marked Data Cache Miss.

Figure 4:
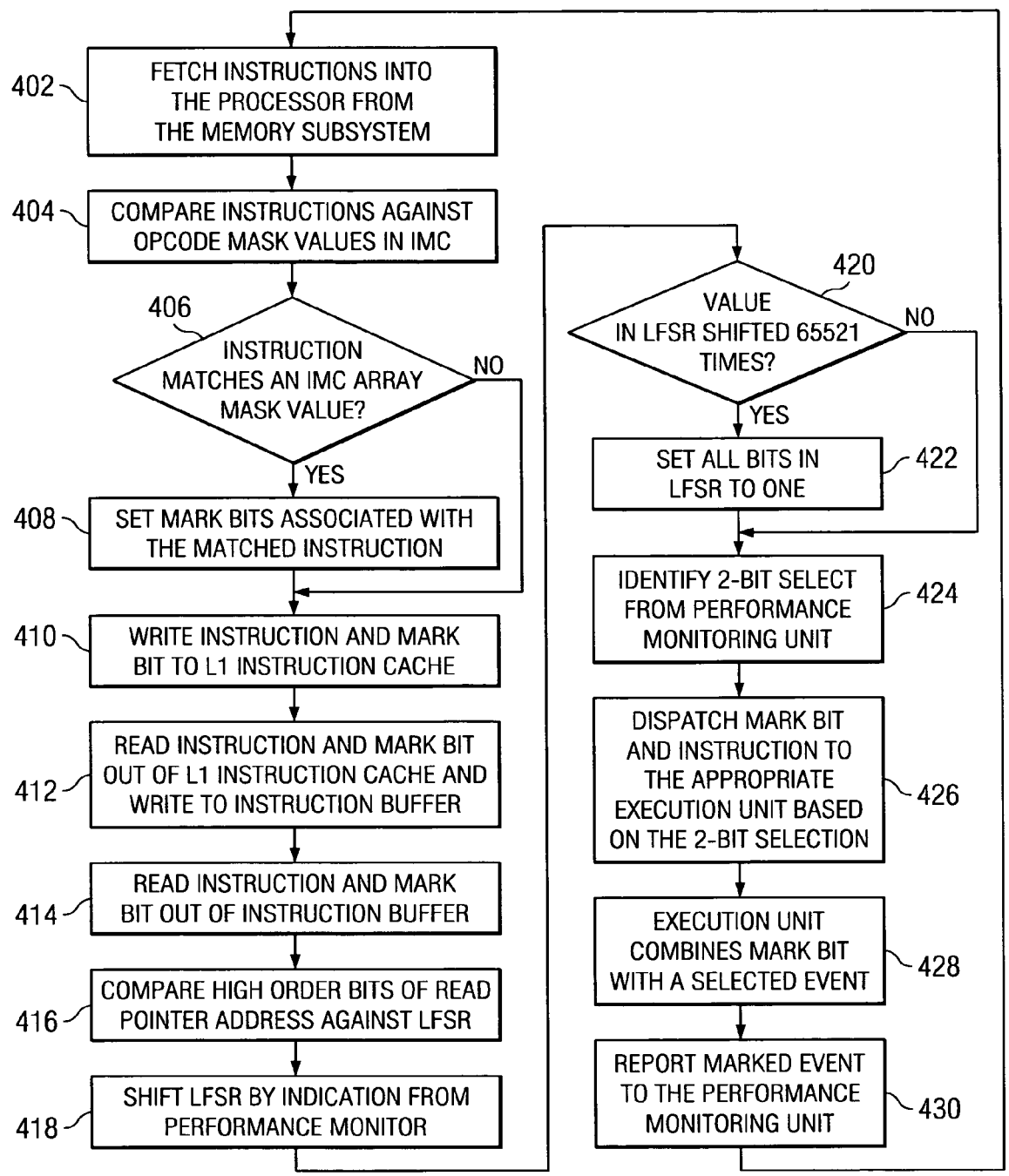
FIG. 4 is a flowchart of a process for randomly selecting instructions for marking in a microprocessor without introducing any bias in accordance with a preferred embodiment of the present invention.

FIG. 4 is a flowchart of a process for randomly selecting instructions for marking in a microprocessor without introducing any bias in accordance with a preferred embodiment of the present invention. The process illustrated in FIG. 4 may be implemented in a processor system, such as, for example, processor system 210 in FIG. 2.

The process begins by fetching instructions into the processor from the memory subsystem (step 402). A comparison is then performed in the Instruction Match CAM (IMC) between the instructions sent to the L1 cache and the opcode masks values in each of the IMC array rows (step 404). A determination is made as to whether any of the instructions match an IMC arrays mask (step 406). If no match is found, the process continues to step 410.

Turning back to step 406, if a match is found, the mark bits associated with the matched instruction are set (step 408). The PowerPC instruction and the mark bit are written to the L1 instruction cache (step 410).

Next, the PPC instruction and the mark bit are read out of the L1 instruction cache and written into an instruction buffer using write pointer (WPTR) (step 412). The PPC instruction and the mark bit are then read out of the instruction buffer using read pointer (RPTR) (step 414). The high order bits of the read pointer address are compared against the LFSR (step 416).

The LFSR is then shifted by an indication from the performance monitor (step 418). A determination is then made as to whether the value in the LFSR has shifted 65521 times (a prime number) (step 420). If the LFSR has shifted 65521 times, the LFSR is set to all ones (step 422). If the LFSR has not shifted 65521 times, the process continues to step 424.

Next, a 2-bit select from the performance monitoring unit is identified (step 424), wherein the 2-bit select is used to determine how the mark bit sent to the execution unit will be set. The mark bit based on the 2-bit select and the instruction are dispatched to the appropriate execution unit (step 426).

When the selected execution unit receives the mark bit, the execution unit combines the mark bit with a selected event (step 428). The marked event is then reported to the performance monitoring unit (step 430), wherein the event may be counted.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMS, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for randomly, without bias, selecting instructions for performance analysis in a microprocessor, the method comprising:
   associating ones of instruction tags to corresponding ones of instructions in an instruction buffer such that each instruction in the instruction buffer has a corresponding instruction tag, wherein the ones of instruction tags comprise corresponding ones of addresses of the corresponding ones of instructions, wherein the instruction buffer comprises a circular queue, and wherein the circular queue comprises a queue in which the corresponding ones of addresses are unrelated to a code stream running on the microprocessor;
   responsive to reading a first instruction in the instruction buffer, comparing first values of first bits of a first instruction tag against second values of second bits, wherein the first instruction tag is associated with the first instruction, and wherein the second values are generated by a pseudo-random pattern generator;
   responsive to the first values matching at least higher orders of the second values, associating an associated mark bit with the first instruction, wherein the associated mark bit indicates that the first instruction is a marked instruction; and
   storing the marked instruction.

2. The method of claim 1 further comprising:
   sending the marked instruction and the associated mark bit to an execution unit for execution;
   responsive to an event associated with the marked instruction, combining the event with the mark bit to form a marked event;
   reporting the marked event to a performance monitoring unit.

3. The method of claim 2 further comprising:
   counting the marked event with the performance monitoring unit to form a count; and
   storing the count.

4. A computer program product comprising:
   a computer readable recordable-type medium having computer usable program code for randomly, without bias, selecting instructions for performance analysis in a microprocessor, the computer usable program code including:
   computer usable program code that associates ones of instruction tags to corresponding ones of instructions in an instruction buffer such that each instruction in the instruction buffer has a corresponding instruction tag, wherein the ones of instruction tags comprise corresponding ones of addresses of the corresponding ones of instructions, wherein the instruction buffer comprises a circular queue, and wherein the circular queue comprises a queue in which the corresponding ones of addresses are unrelated to a code stream running on the microprocessor;
   computer usable program code that, responsive to reading a first instruction in the instruction buffer, compares first values of first bits of a first instruction tag against second values of second bits, wherein the first instruction tag is associated with the first instruction, and wherein the second values are generated by a pseudo-random pattern generator; and
   computer usable program code that, responsive to the first values matching at least higher orders of the second values, associates an associated mark bit with the first instruction, wherein the associated mark bit indicates that the first instruction is a marked instruction.

5. A data processing system comprising:
   a bus;
   at least one processor coupled to the bus;
   a computer usable medium coupled to the bus, wherein the computer usable medium contains a set of instructions for randomly, without bias, selecting instructions for performance analysis in a microprocessor, wherein the at least one processor:
   associates ones of instruction tags to corresponding ones of instructions in an instruction buffer such that each instruction in the instruction buffer has a corresponding instruction tag, wherein the ones of instruction tags comprise corresponding ones of addresses of the corresponding ones of instructions, wherein the instruction buffer comprises a circular queue, and wherein the circular queue comprises a queue in which the corresponding ones of addresses are unrelated to a code stream running on the microprocessor;
   responsive to reading a first instruction in the instruction buffer, compares first values of first bits of a first instruction tag against second values of second bits, wherein the first instruction tag is associated with the first instruction, and wherein the second values are generated by a pseudo-random pattern generator; and
   responsive to the first values matching at least higher orders of the second values, associates an associated mark bit with the first instruction, wherein the associated mark bit indicates that the first instruction is a marked instruction.

* * * * *